United States Patent [19]

Sorribes Arambul

[11] Patent Number: 4,736,665

[45] Date of Patent: Apr. 12, 1988

[54] MUSICAL LANGUAGE GAME

[76] Inventor: Manuel Sorribes Arambul, Calle San Edesio, 5 Puerta 34ª, Manises (Valencia), Spain

[21] Appl. No.: 821,759

[22] Filed: Jan. 23, 1986

[30] Foreign Application Priority Data

Jan. 25, 1985 [ES] Spain ................................. 284.157

[51] Int. Cl.⁴ .................................................. G09B 15/02
[52] U.S. Cl. ...................................... 84/471 R; 84/476
[58] Field of Search ..................... 84/471 R, 476, 472

[56] References Cited

U.S. PATENT DOCUMENTS

| 145,622 | 12/1873 | Brown et al. | 84/471 R |
| 195,924 | 10/1877 | Goodwin | 84/471 R |
| 493,126 | 3/1893 | Sharpe | 84/472 |
| 1,058,976 | 4/1913 | Huie-Locke | 84/472 |
| 1,319,919 | 10/1919 | Barker | 84/471 R |
| 2,063,269 | 12/1936 | Randolph | 84/471 R |
| 2,298,081 | 10/1942 | Cohen | 84/471 R |
| 2,770,160 | 11/1956 | Ulvad | 84/471 X |
| 3,186,292 | 6/1965 | Burns | 84/476 X |
| 4,128,037 | 12/1978 | Montemurro | 84/476 |

FOREIGN PATENT DOCUMENTS

| 382315 | 10/1923 | Fed. Rep. of Germany | 84/471 R |
| 1155553 | 5/1958 | France | 84/476 |

Primary Examiner—Lawrence R. Franklin
Attorney, Agent, or Firm—Ostrolenk, Faber, Gerb & Soffen

[57] ABSTRACT

A musical language game including a plurality of board modules with musical staff lines in the form of painted grooves on one face of the board. A series of grooves are defined on another face of the board. Melody pieces permit forming of the notes on the musical staff and include a projection for extending into one of the staff grooves. Additional pieces include projections for being received in the other face grooves and include respective lateral projections which permit assembly of individual pieces to define a rhythmic scheme.

11 Claims, 12 Drawing Sheets

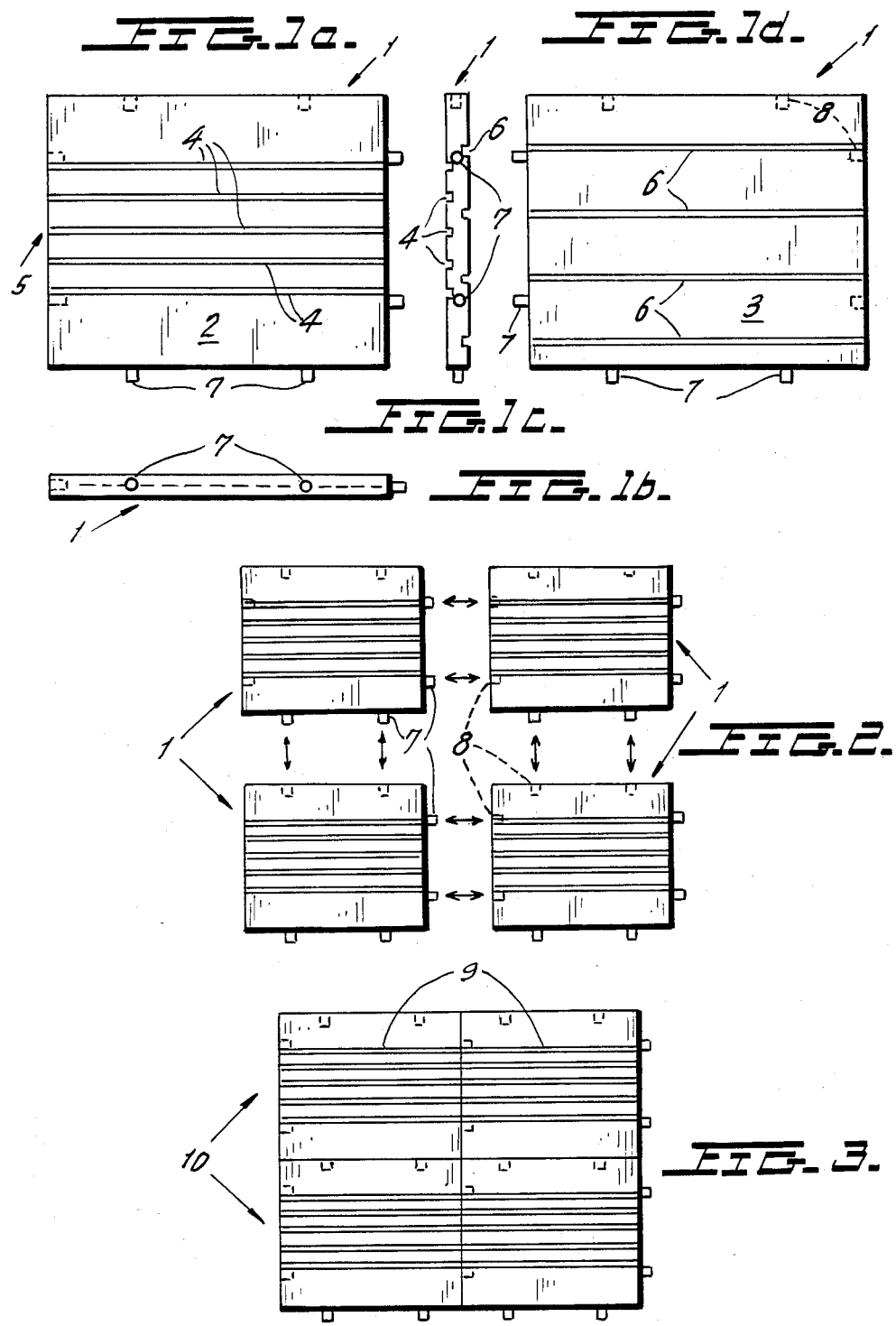

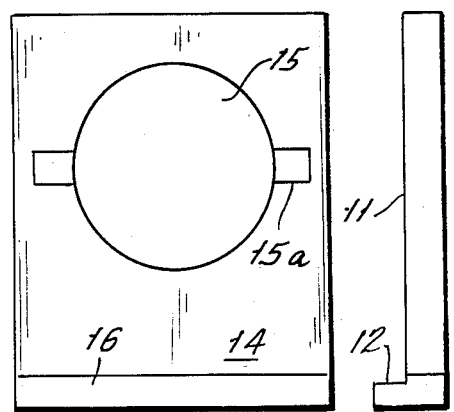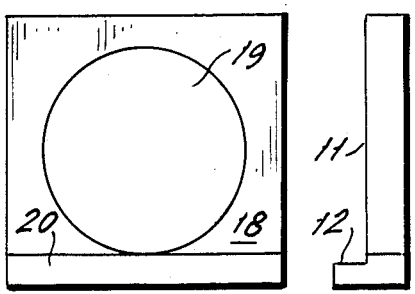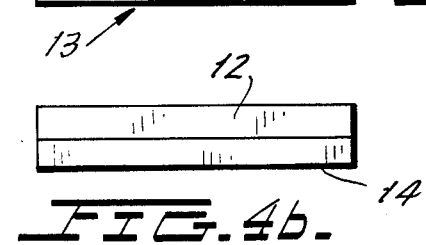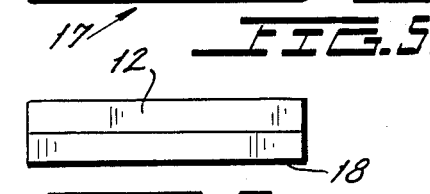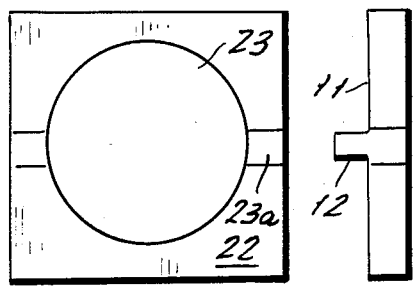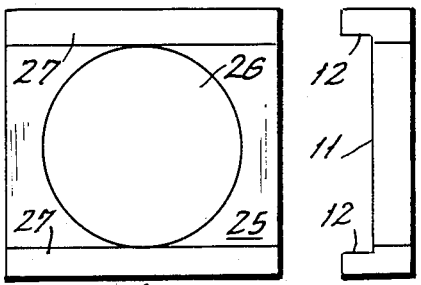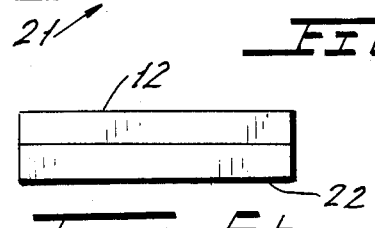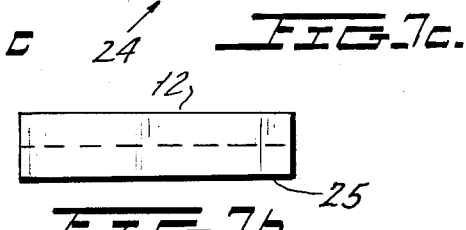

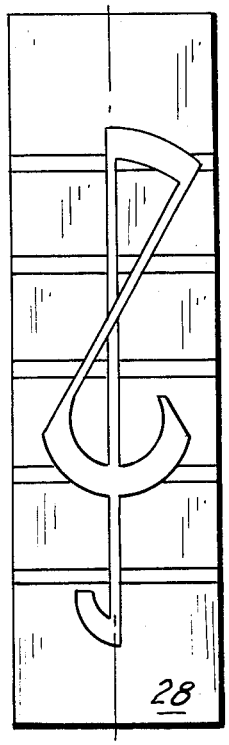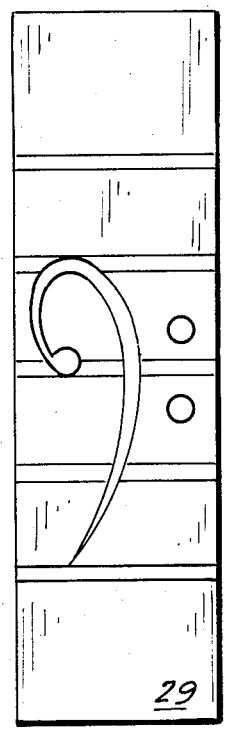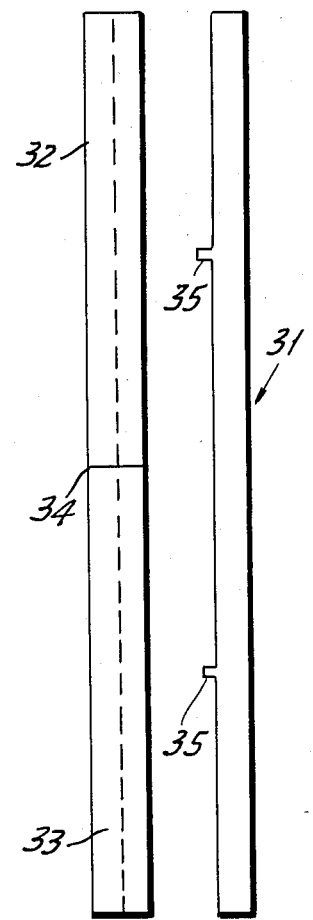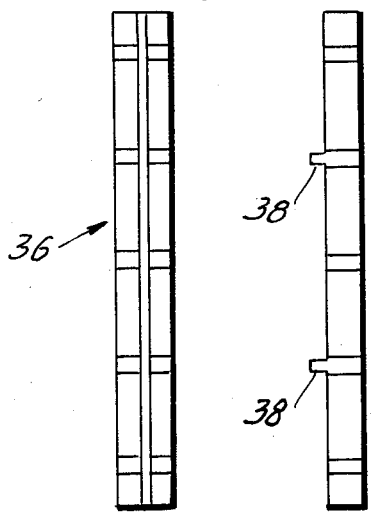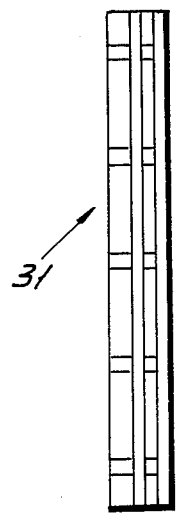

FIG. 15. 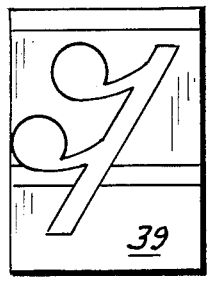 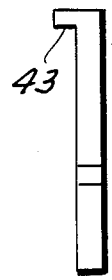 FIG. 17. 
FIG. 16.
FIG. 18. 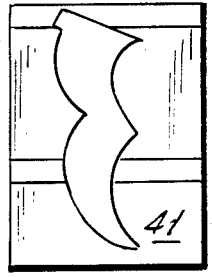 FIG. 19. 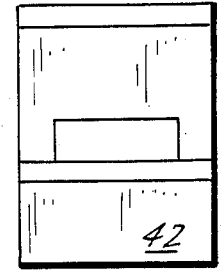
FIG. 20. 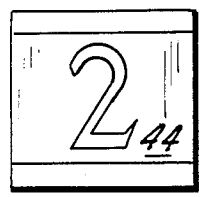 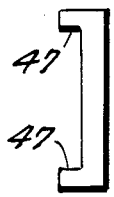 FIG. 22. 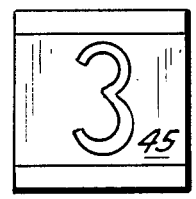 FIG. 23. 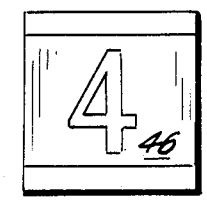
FIG. 21.
FIG. 24.  FIG. 26.  FIG. 28. 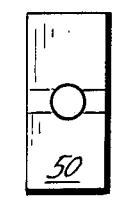 FIG. 30. 
 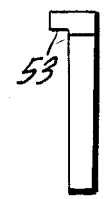  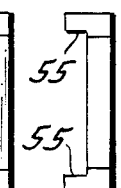
FIG. 25. FIG. 27. FIG. 29. FIG. 31.

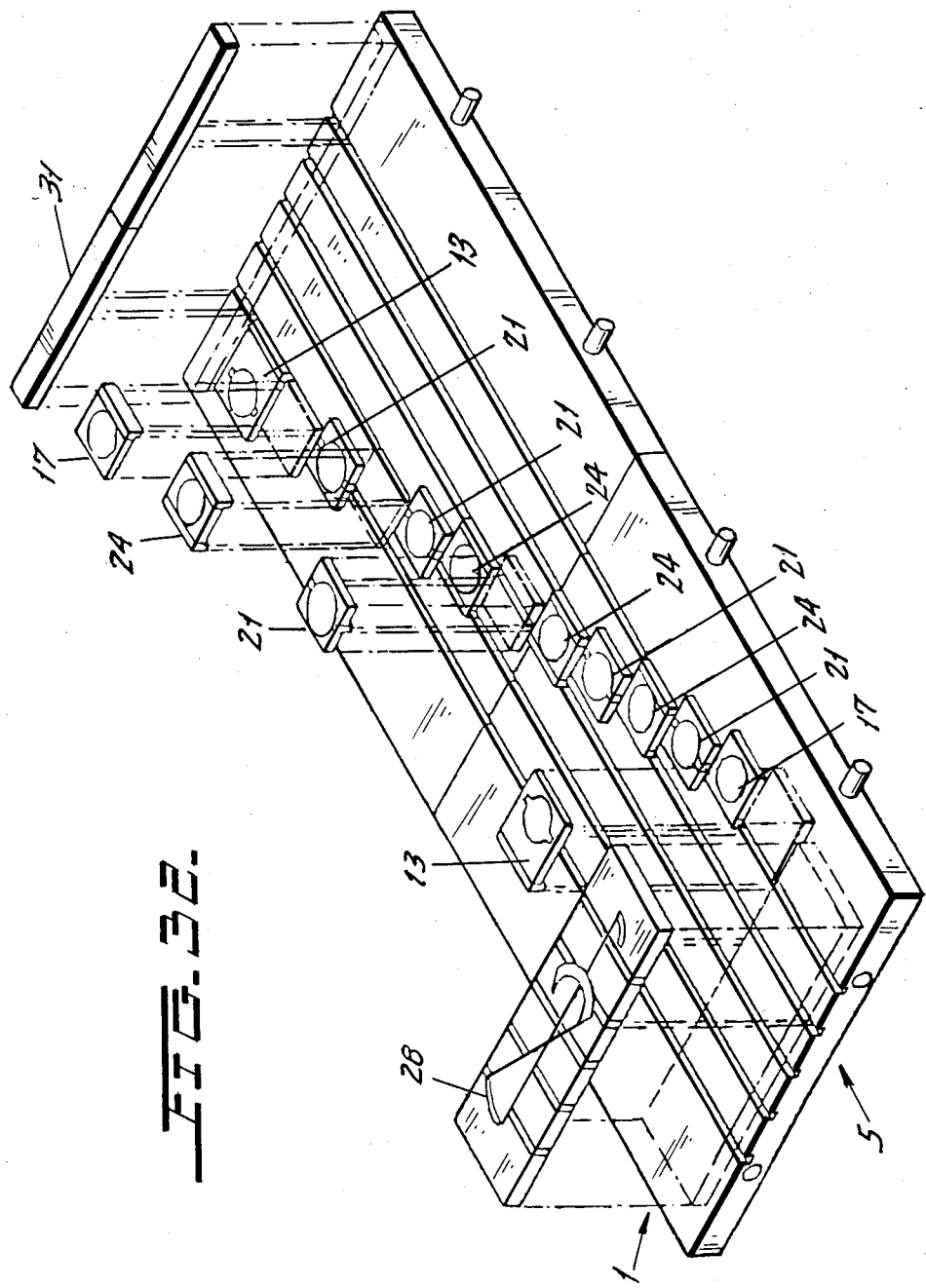

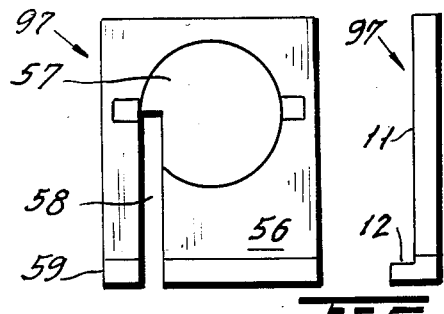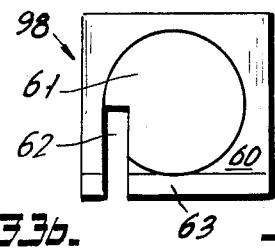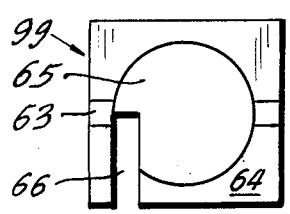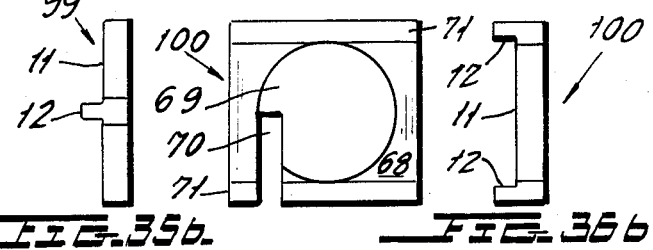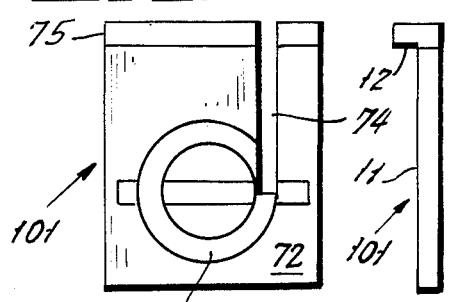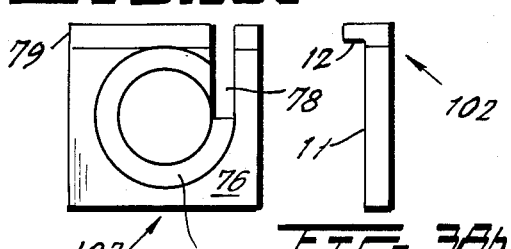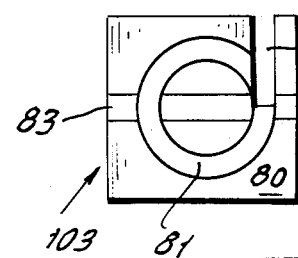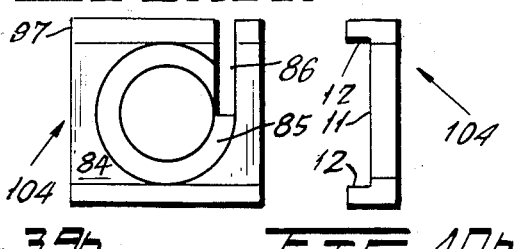

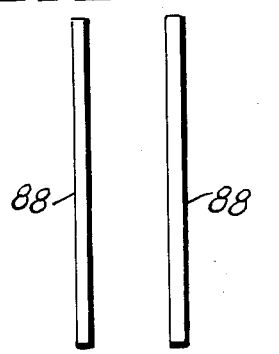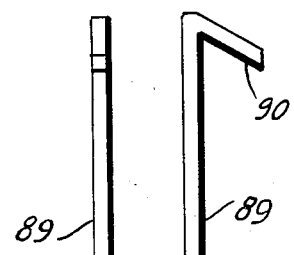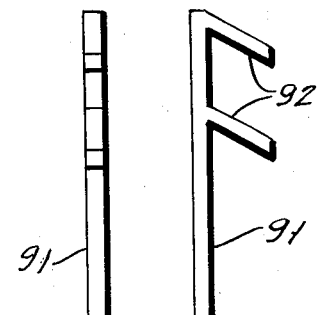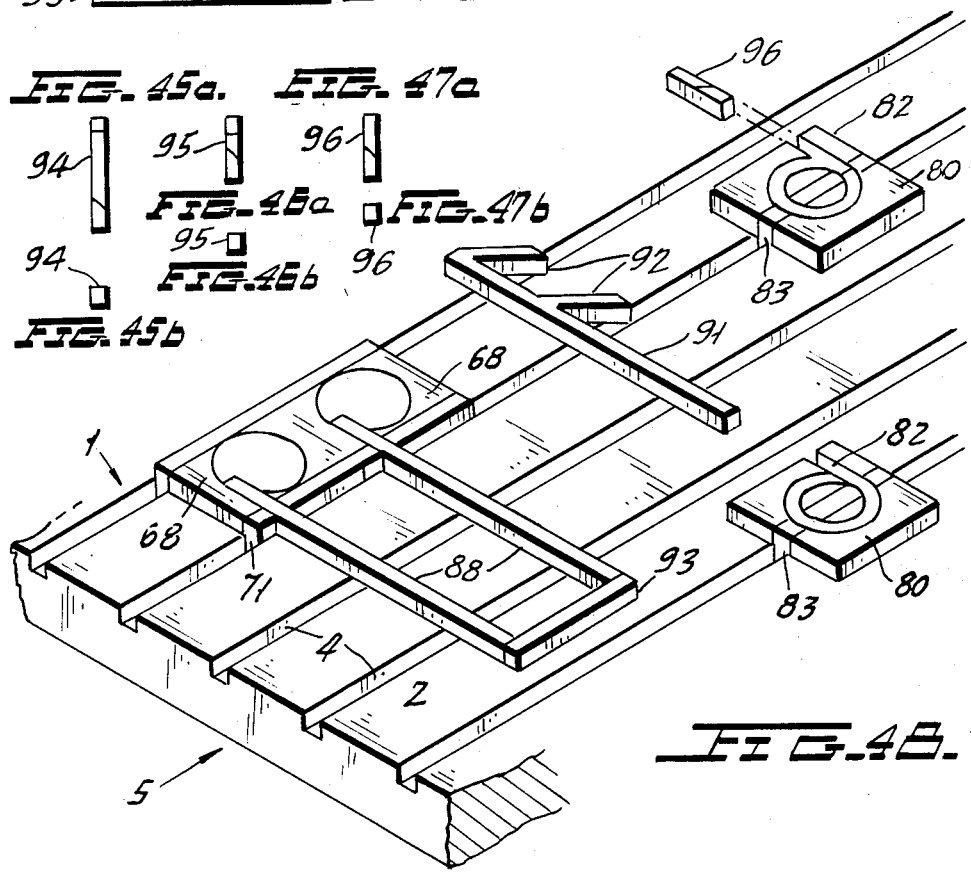

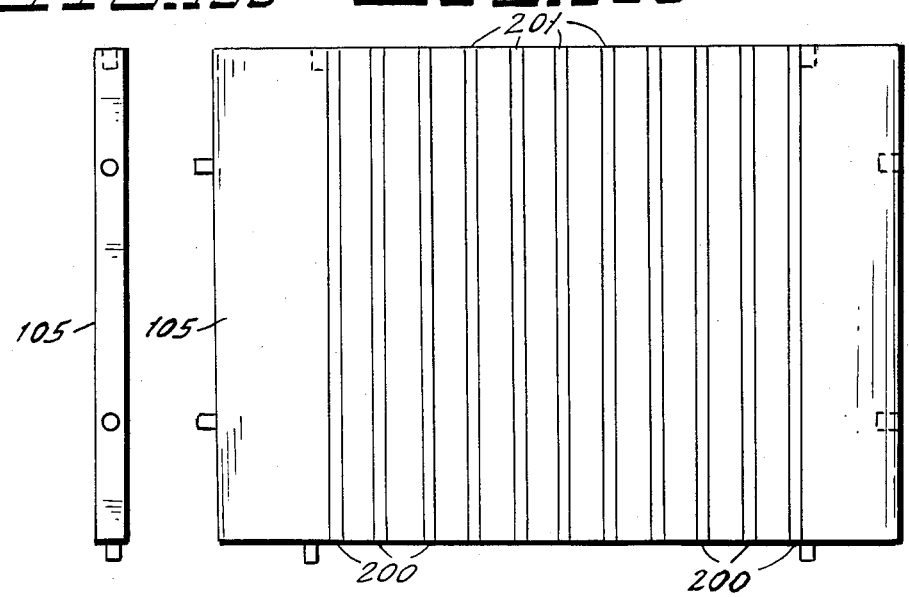
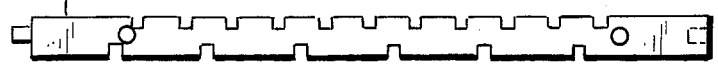
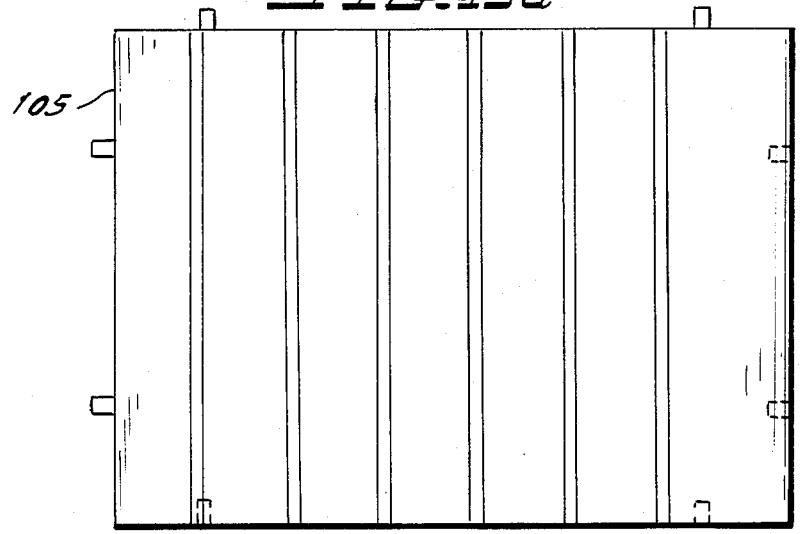

FIG.50a.  FIG.50c.
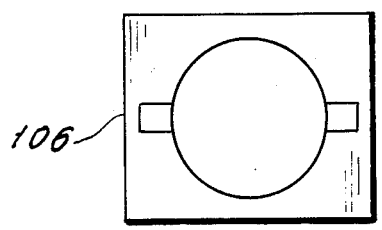 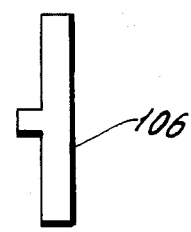

FIG.51a.  FIG.51c.
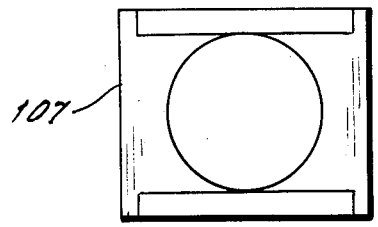 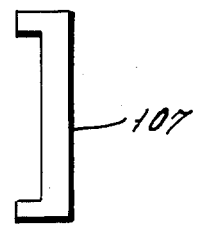

FIG.52a.  FIG.52c.
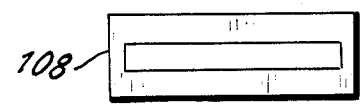 

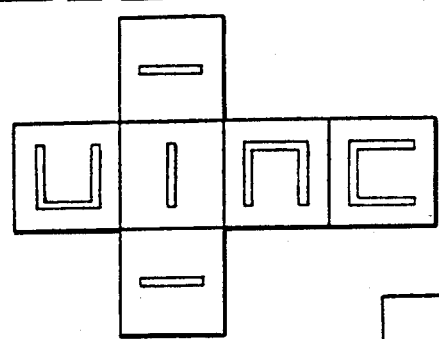
FIG. 53b.
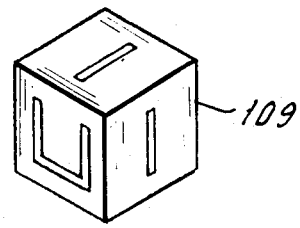
FIG. 53a.
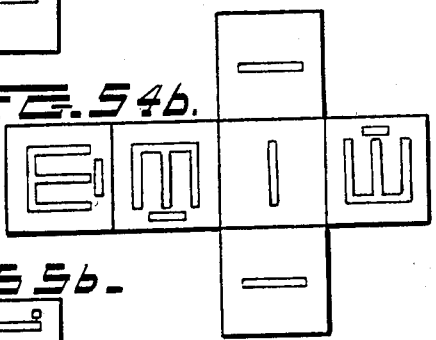
FIG. 54b.
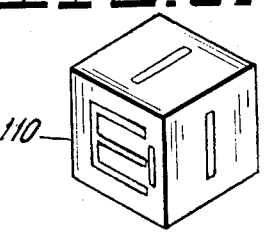
FIG. 54a.
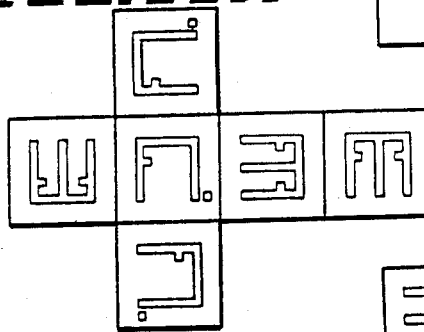
FIG. 55b.
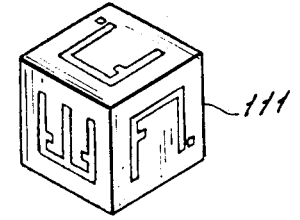
FIG. 55a.
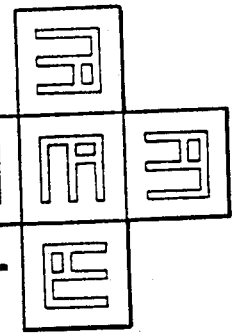
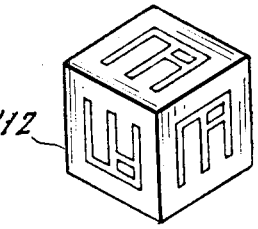
FIG. 56a.
FIG. 56b.
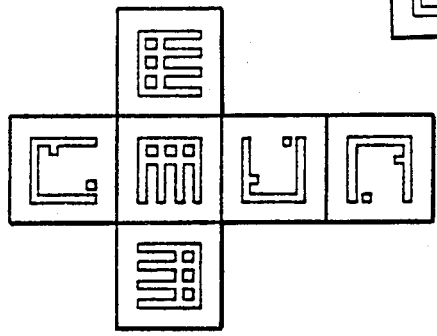
FIG. 57b.
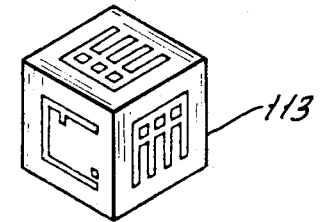
FIG. 57a.

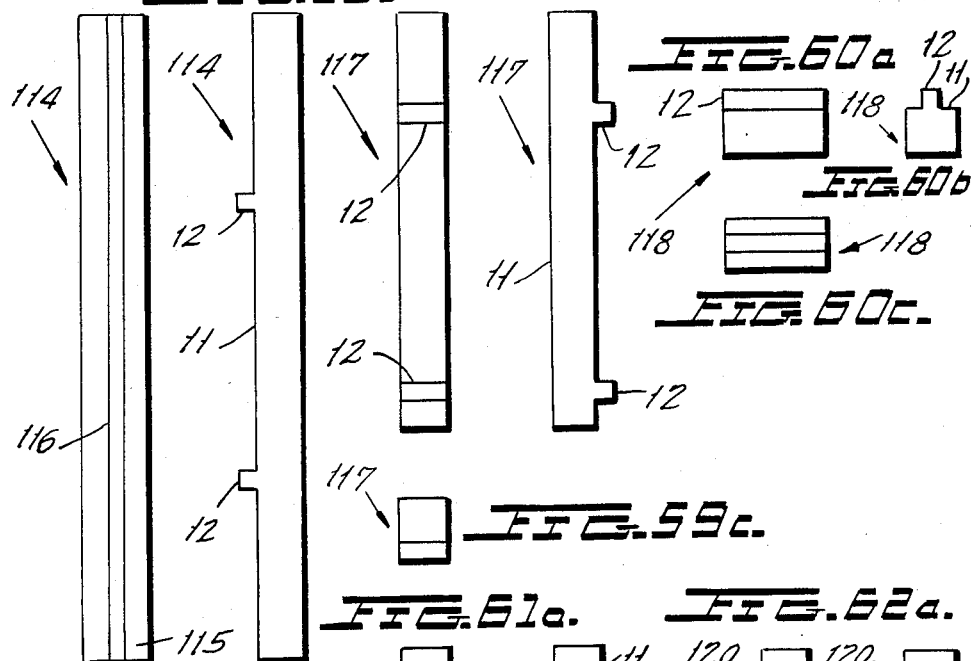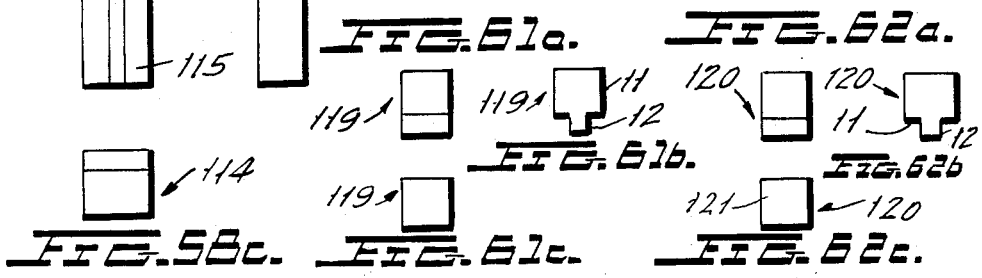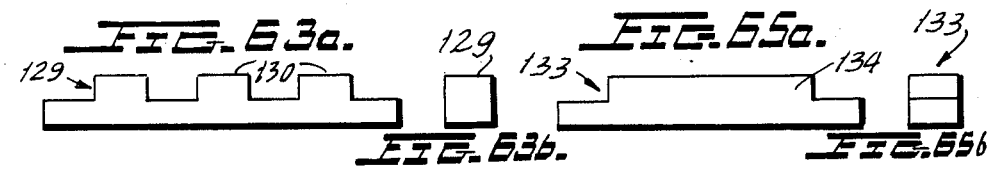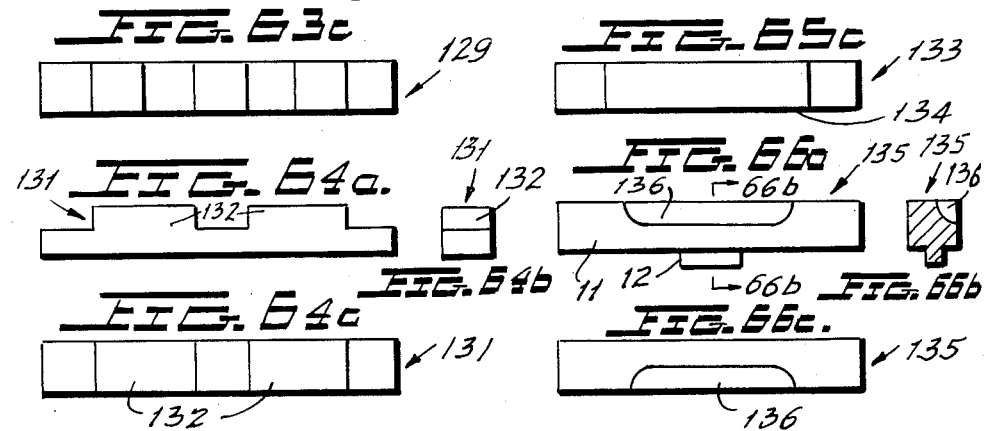

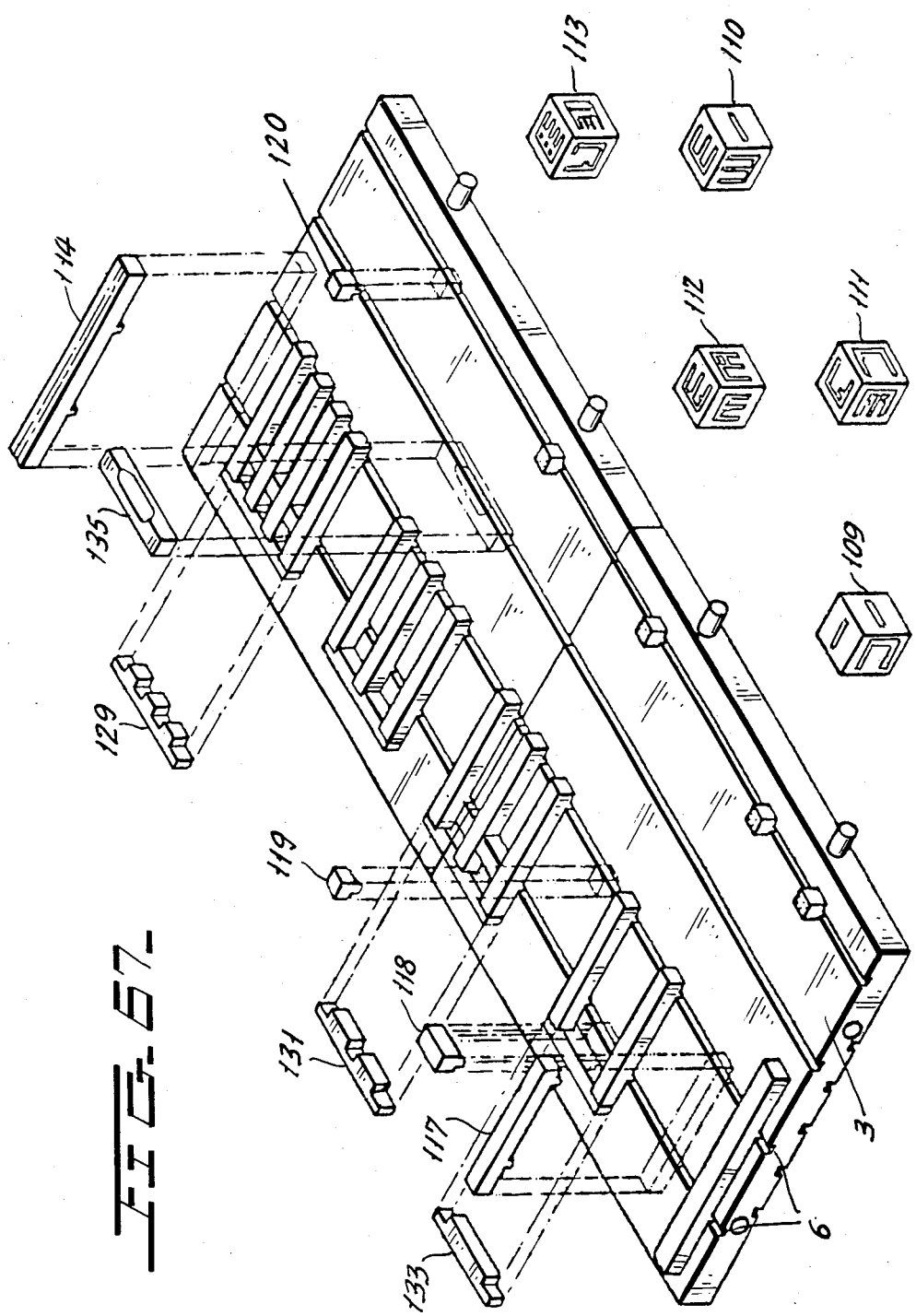

MUSICAL LANGUAGE GAME

This invention relates to a musical language game.

SUMMARY OF THE INVENTION

The game according to the invention is comprised of:

(a) A board which can be assembled by coplanarly coupling together several board modules. Said board presents on one of its faces the five lines of the musical staff being formed by five grooves that are painted to be distinguished from the rest of the board. The board presents on the opposite face at least three longitudinal grooves.

(b) A series of pieces; some of them being rectangular and provided on their back face with at least a longitudinal projection allowing their coupling to at least one of the musical staff grooves; some of the rectangular pieces are also provided with a notch which is complementary with a number of stem pieces; the stem pieces may then be coupled to the notched rectangular pieces for completing the note as deemed necessary.

(c) A series of pieces intended for being placed on the back face of the board and assembled in the grooves thereof. This series of pieces is comprised of; pieces intended for being crosswised placed and which are provided with two projections allowing assembly on two grooves; short longitudinal pieces also provided with a longitudinal projection for being assembled in one of the grooves; connecting pieces provided with projections intended for being assembled on the upper portion of the crosswise pieces; and cubic pieces provided with a projection on one of the faces thereof and the face opposite to the projection having a different color for indicating a time.

(d) A series of blocks presenting on their faces a basic rhythmic scheme.

The rectangular pieces present on their back face, depending on their location, one longitudinal projection or two longitudinal projections. The portions of the rectangular pieces intended for being placed on a line of the musical staff are painted of the same color as the latter in order to give continuity to the line.

Each board module can be provided, at either side of the musical staff, with an additional non-painted line. In this case, the rectangular pieces intended for being placed on the end lines of the musical staff will be provided with two projections.

For a better understanding of the invention there is now given a detailed description of the enclosed drawings, wherein the different elements constituting the game and the way in which they are mounted will be described.

This game deals with learning the musical language by handling and distinguishing the differences between various pieces used in the game which, in turn, are a function of the fundamental aspects of said musical language.

In accordance with the operative scheme that we find in said musical language, this game will succeed in teaching children to reinforce their auditive sense with the visual sense of reading and will develop, through handling, a practical means to express their own auditive images.

BRIEF DESCRIPTION OF THE DRAWINGS

FIGS. 1a–1d are elevation and side views of a board module according to the present invention.

FIG. 2 is an elevation view of four unassembled board modules.

FIG. 3 is an elevation view of four assembled board modules.

FIGS. 4a–4c, 5a–5c, 6a–6c, 7a–7c, are elevation and side views of the four basic types of melody pieces.

FIGS. 8–10 are elevation and side views of the cleft pieces.

FIGS. 11a–11b are the elevation and side view of the symmetry bar piece.

FIGS. 12–14 are elevation and side view of the bar line and double bar line pieces.

FIGS. 15–19 are elevation and side view of the rest pieces.

FIGS. 20–23 are elevation and side views of the time pieces.

FIGS. 24–31 are the elevation and side view of the dot pieces.

FIG. 32 is an exploded view of the front face of the board module and the proper placement of the various melody pieces.

FIGS. 33a–b, 34a–b 35a–b, 36a–b, 37a–b, 38a–b, 39a–b, 40a–b are elevation and side views of the eight-notched melody pieces.

FIGS. 41a–b, 42a–b, 43a–b, 44a–b, 45a–b, 46a–b, 47a–b show elevation and side views of the seven complementary stem pieces.

FIG. 48 is an exploded view of a board module illustrating the proper placement of the notched melody pieces and tne complementary stem pieces.

FIGS. 49a–d are elevational and side views of a second embodiment of a board module according to the present invention.

FIGS. 50c–c 51a–c 52a–c are elevation and side views of variations of the four basic melody pieces.

FIGS. 53a–b, 54a–b, 55a–b 56a–b, 57a–b are perspective and developmental views of the five rhythmic scheme blocks.

FIGS. 58a–c are elevation and side views of a bar line piece.

FIGS. 59a–c are elevation and side views of a crosswise piece.

FIGS. 60a–c are elevation and side views of a longitudinal piece.

FIGS. 61a–c are elevational side views of a cubic piece.

FIGS. 62a–c are elevation and side views of a cubic piece having a colored portion.

FIGS. 63a–c, 64a–c, 65a–c are elevation and side views of various longitudinal connecting pieces.

FIGS. 66a–c are elevation and side views of a special triplet piece.

FIG. 67 is an exploded view of the backface of the board module and the proper placement of the various rhythmic pieces.

DETAILED DESCRIPTION OF THE INVENTION

Figure 50B:
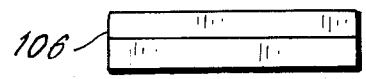

Description of Board Modules: Sheet 1 of 11

Each board module 1 consists of two fully defined faces: A front face 2 depicted in FIG. 1a and a back face 3 depicted in FIG. 1d. The front face 2 has five guide-like parallel grooves 4 which together form a musical staff 5. The five grooves 4 of the staff 5 are further distinguished from the rest of the front face 2 by their color. The back face 3 has four guide-like parallel grooves 6 which preferably do not have any color difference with the rest of the back face 3. FIG. 1c is a side view of the board module 1 and FIG. 1b is a top view of the board module 1.

A plurality of board modules 1, as shown in FIG. 2, are able to be horizontally and vertically assembled so as to form a continuous musical staff 9 and/or a number of rows 10 of musical staffs as shown in FIG. 3. Assembly is achieved by inserting pegs 7 into holes 8. Such assembly may also provide continuous grooves 6 on the back face 3 of modules 1 (not shown) and also allow for rows of said continuous grooves 6.

Description of the Four Basic Melody Pieces: Sheet 2 of 11

Referring to FIGS. 4-7, there are four basic types of melody pieces, each of which has an attaching side 11 with at least one longitudinal projection 12 extending therefrom for attaching to at least one of the musical staff grooves 4. Each piece also having a viewing side with indicia on said viewing side which distinguishes the pieces from one another.

Each of the four types of melody pieces has different indicia on its viewing side each melody piece type being respectively depicted in FIG. 4a, 5a, 6a and 7a. Also, each piece type has formed thereon either a darkened circle for forming one-quarter, one-eighth, one-sixteenth, etc., notes, or simply a circle (see FIG. 38a) for forming whole or one-half notes, as described more fully later herein. The description below identifies a darkened, that is a filled in, note as a "darkened" note and refers to a "circled" note undescriptively as simply a "note". Further, several of the notes have a line passing through them to indicate that the note lies on a staff or a ledger line. As used herein, a "lined" note is a note having such a line which coincides with a staff or ledger line and an "unlined" note is a note on a melody piece having no such line and therefore being placeable only between staff or ledger lines. FIGS. 4a-c show a melody piece 13 wherein the indicia on the viewing side 14 of the piece is comprised of a line darkened continuation of a staff note 15 and a line 16. The line 15a represents a ledger line. FIGS. 5a-c show a melody piece 17 wherein the indicia on a viewing side 18 of the piece is comprised of an unlined darkened note 19 next to a staff line 20. FIGS. 6a-c show a melody piece 21 wherein indicia on a viewing side 22 of the piece is comprised of a lined darkened note 23. The line 23a represents the continuation of a staff line. FIGS. 7a-c show a melody piece 24 wherein the indicia on a viewing side 25 of the piece is comprised of a unlined darkened note 26 between two parallel lines 27. The four types of basic melody pieces as above described are to be used to form a musical melody on the front face 2 of the board module 1 by placing the pieces (which depict lined or unlined darkened notes) on, above or below the musical staff 5 in various different positions. Examining FIG. 32 on sheet 5 of 11 and taking the G-clef for C-major tonality, the result is as follows:

melody piece 13 can be used only for notes C-low, A-high;
melody piece 17 can be used only for the notes D-low, G-high;
melody piece 21 can be used only for the notes from the lowest to the highest position as follows: E-first line; G-second line, B-third line; D-fourth line; F-fifth line;
melody piece 24 can be used only for notes from the lowest to the highest position, as follows:
F—between first and second lines;
A—between second and third lines;
C—between third and fourth lines;
E—between fourth and fifth lines.

Description of Clef Pieces, Symmetry Bar Pieces, Bar Line and Double Bar Line Pieces: Sheet 3 of 11

Sheet 3 of 11 shows clef pieces and other miscellaneous pieces to be used on the front face 2 of the board module 1. FIG. 8 shows a G-clef piece 28. FIG. 10 shows an F-clef piece 29. FIG. 9 shows a longitudinal projection 30 which can be used with either the G-clef piece 28 or the F-clef piece 29 for attaching these pieces to the musical staff 5.

FIGS. 11a-b show a symmetry bar piece 31 divided at a symmetry center 34 into differently colored upper half 32 and lower half 33. The symmetry center 34 mates with the third line of the five lines comprising the musical staff 5. Longitudinal projections 35 are also provided.

FIG. 12 shows a bar line piece 36. FIG. 14 shows a double bar line piece 37. FIG. 13 shows a side view of either FIG. 12 or FIG. 14 indicating the placement of longitudinal projections 38 for attaching said pieces to the musical staff 5. To the bar line piece 36 and the double bar line piece 37, there can be attached two dots, not shown, symmetrically located on the upper and lower parts of the third line, thus being the complement indicating a second readout of previous times.

The G-clef piece 28 and the symmetry bar piece 31 as used on the board modules is shown in FIG. 32 on sheet 5 of 11.

Description of Rest Pieces, Time Pieces and Dot Pieces: Sheet 4 of 11

Sheet 4 of 11 shows rest pieces, time pieces and dot pieces. FIGS. 15, 17, 18 and 19 respectively show a semiquaver (1/16) rest piece 39, a quaver (⅛) rest piece 40, a crotchet (¼) rest piece 41 and a minim (½) rest piece 42. Turning rest piece 42 upside down makes it a semibreve (whole) rest piece. FIG. 16 shows the placement of a longitudinal projection 43 for rest pieces 39, 40, 41 and 42. All possible rests in the musical language can be covered, such as a demi-semi-quover (1/32) rest, a sixty-fourth note rest, as well as rests with their respective dots.

FIGS. 20, 22 and 23 respectively show a numeral 2 time piece 44, a numeral 3 timepiece 45 and a numeral 4 timepiece 46. Suitably combined, the numbered pieces give rise to the resolution of the type of time heading for the musical score in question, e.g. 2/4, ¾, 4/4. It is understood that, with proper figures, all possibilities of times existing in the musical language can be covered. FIG. 21 shows the placement of longitudinal projections 47 for the various time pieces.

FIGS. 24-31 show various dot pieces 48, 49, 50 and 51 and their accompanying longitudinal projection pieces, 52, 53, 54 and 55. The dot pieces may be used to accompany the eight types of notched melody pieces shown in sheet 6 of 11, including their complementary stem pieces, also shown in sheet 6 of 11.

Description of the Eight Notched Melody Pieces and Complementary Stem Pieces: Sheet 6 of 11

There are eight types of notched melody pieces, FIGS. 33-40, each of which has an attaching side 11 with at least one longitudinal projection 12 extending therefrom. Each piece also has a viewing side with indicia on said side which distinguishes the pieces from one another. Each piece also has a notch which is complementary with a number of stem pieces for completing the notched melody pieces to make various notes.

Each of the eight notched melody pieces has a different indicia on its viewing side. FIGS. 33a–b show a piece 97 wherein the indicia on the viewing side 56 of the piece is comprised of a lined darkened note 57 and a staff line 59 and wherein a notch 58 is provided for coupling to stem pieces for completing the note as necessary. Each of the other seven notched melody pieces have similar elements. FIGS. 34a–b show a piece 98 with a notch 62 and a viewing side 60 having an unlined darkened note 61 and a line 63. FIGS. 35a–b show a piece 99 with a notch 66 and a viewing side 64 having a lined darkened note 65. FIGS. 36a–b show a piece 100 with a notch 70 and a viewing side 68 having an unlined darkened note 69 and two lines 71. FIGS. 37a–b show a piece 101 with a notch 74 and a viewing side 72 having a lined note 73 and a line 75. FIGS. 38a–b show a piece 102 with a notch 78 and a viewing side 76 having an unlined note 77 and a line 79. FIGS. 39a–b show a piece 103 with a notch 82, a line 83, and a viewing side 80 having a lined note 81. FIGS. 40a–b show a piece 104 with a notch 86 and a viewing side 84 having an unlined note 85 and two lines 87.

FIGS. 41–47 show the complementary stem pieces. FIGS. 41a–b show a single stem 88. FIGS. 42a–b show a single stem 89 and a flag 90. FIGS. 43a–b show a single stem 91 and two flags 92. FIGS. 44a–b show a single longitudinal bar 93 for connecting two consecutive single stem notes as shown in FIG. 48.

various length single stems 94, 95, FIGS. 45–47 show various length single stems 94, 95, 96.

Notched melody pieces 97, 98, 99, 100 when coupled with the various stem pieces are suitable for attaining the values, crotchet (¼), quaver (⅛), semiquaver (1/16), as well as intermediate and lower values when combined with the dots in FIGS. 24–31, e.g. dotted crotchet, dotted quaver, etc., may be obtained by using the dot pieces. In summary, these pieces give the possibility of handling all notes below the dotted crotchet.

Notched melody pieces 101, 102, 103, 104 when coupled with the various stem pieces are used for attaining the values of minims (½), as well as the dotted minim (by using the dotted pieces). In summary, these pieces give the possibility of handling the dotted minim and the minim.

The eight types of notched melody pieces, FIGS. 33–40, and the four types of melody pieces, FIGS. 4–7, may be used to form a musical melody on the front face 2 of board module 1 by placing the pieces on, above or below the musical staff. The aforesaid takes for granted the total application and domain of this game for the musical language. Proper handling of the pieces is performed by mating the lines of the aforesaid pieces (except the horizontal lines of markings 57, 73 the pieces, 97, 101 of sheet 6 of 11) with the corresponding lines on the musical staff 5 which are applied onto the front face 2 of board module 1.

Description of Musical Staff Variations on the Board Module: Sheet 7 of 11

Board module 105 in FIGS. 49a–d makes possible the extensions towards lower notes (lower portion of module). The complementary guides 200 must have the color of the board module in order to be differentiated from the five central guides 201 (all of them of the same color and different to the rest of the module face), constituting the musical language on the five lines of the staff.

Description of Variations of the Four Basic Melody Pieces: Sheet 2 of 11 (Sheet 8 of 11)

Figure 51B:
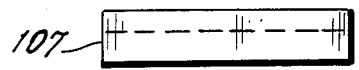
Figure 52B:
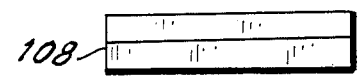

FIGS. 50–52 show variations of the basic melody pieces shown in FIGS. 4–7 that may be used on the board module 105 shown in FIG. 49. These pieces 106, 107, 108 may be used above and below the five central guides 201 on board module 105 by attaching to complementary guides 200.

The melody piece 106 may be substituted for melody piece 13 of sheet 2 of 11. Referring to the guides in FIG. 44a, from left to right, the melody pieces 106, 107, 108, 17, 21, 24 may be used to obtain, if we are in G-clef and in the tonality of C-major, by taking into account the direction from the lowest sound to the highest in the applied module, the following notes: F, G, A, B, C, D, E, F, G, A, B, C, D, E, F, G, A, B, C, D, E, correlatively located in the middle of a line and between two lines, alternatively.

In this game, in addition to the G-clef, there are also covered the F-clef and C-clef, as well as all the corresponding tonalities, by only extending the pieces with the signatures of sharp and flat (not shown).

The melody pieces 106, 107, 17, 21, 24 may be combined with the notched melody pieces 97, 98, 99, 100, 101, 102, 103, 104 as shown on sheet 6 of 11, as well as the complementary stem pieces and then it would be possible to create the complete reconstruction of a musical score. Module 105 in FIG. 49a would provide the additional lines of the musical staff in question, if necessary.

Development and Isometry of Five Possible Types of Rhythmic Scheme Blocks: Sheet 9 of 11

Rhythmic scheme blocks are illustrated in FIGS. 53–57. The blocks have markings on each of their faces, each face indicating a rhythmic scheme. The blocks 109, 110, 111, 112, 113, considering the grade of complexity from block to block, may be repetitively used (as many times as considered necessary) in order to, as in a game of chance, reproduce on the back face 3 of board module 1 the rhythmic scheme that appears at the upper portion of each one of the blocks.

This reproduction may be carried out by means of the pieces shown on sheet 10 of 11.

Description of Pieces to Construct Rhythmic Schemes: Sheet 10 of 11

FIGS. 58–65 show various rhythmic scheme pieces, some of which have longitudinal projections 12 on their back faces 11 for attaching the pieces to at least one of the grooves 6 on the back face 3 of the board module 1 in FIG. 1d.

FIGS. 58a–c show a piece 114 with a bar line 116 on its front face 115.

FIGS. 59a–c show a cross-wise piece 117 which can be used individually or combined with the other remaining pieces as shown on sheet 10 of 11 (except the piece 114) for reproduction of any of the rhythmic schemes, appearing on blocks 109, 110, 111, 112, 113.

FIGS. 60a–c show a short longitudinal piece 118 which can be combined with the other pieces 117, 119, 131, 133 as shown on sheet 11 of 11 for reproducing the rhythmic schemes of block 111 and for block 112.

FIG. 61a–c show a cubic piece which may be combined with the other pieces 117, 118, 129, 131, 133 as shown on sheet 11 of 11 for reproducing the rhythmic schemes pertaining to block 111 and block 113.

FIG. 62a–c show a cubic piece 120 similar to the piece 119. Cubic piece 120, however, is differentiated by its upper portion color 121 and it is used for defining the length of each rhythmic signature that, considering the basis of the musical language, represents pulses of whole times.

FIGS. 63–65 show various longitudinal connecting pieces 129, 131, 133 having projections 130, 132, 134 for assembling to the cross-wise pieces 117 and forming the rhythmic schemes shown on the blocks 109, 110, 111, 112, 113.

FIGS. 66a–c show a special triplet piece 135 which may be combined with pieces 117, 131 for reproducing the triplet 136 pertaining to rhythmic block 110.

The combination of the aforesaid pieces (sheet 10 of 11) is visualized in the recomposition of some rhythmic schemes as shown on sheet 11 of 11 at FIG. 67.

What is claimed is:

1. A musical language game, comprising:
   a board module having a front face with at least five, equally spaced, parallel longitudial grooves defined within said front face, said grooves defining and coinciding with a musical staff; and
   a melody piece having a viewing side and an attaching side, said attaching side having a longitudinal projection extending therefrom for inserting into one of said grooves, said melody piece being supported, on said board module, solely by securement in at least one of said grooves, said board module having only said longitudinal grooves on its said front face for supporting said melody piece, said viewing side having a first indicium depicting a note and a second indicium depictig a line, said line running the length of the melody piece, constituting a staff line continuation and being positioned directly over and parallel to said projection, whereby said line serves as a continuation of the respective said groove into which said projection engages.

2. A musical language game according to claim 1, wherein said note indicium of said melody piece is centered on said line indicium.

3. A musical language game according to claim 1, wherein said note indicium of said melody piece is next to said line indicium.

4. A musical language game according to claim 1, said melody piece further having a second longituidnal projection extending from said attaching side and positioned with respect to said first projection for inserting both projections simultaneously into adjacent grooves, said melody piece further having a third indicium depicting a second line on said viewing side, said second line parallel to said first line and positioned directly over said second projection, said note indicium positioned between said first and second line indicia.

5. A musical language game according to claim 1, wherein said grooves of said musical staff are of a color to be observable on said board module and said line indicium is the same color as said grooves.

6. A musical language game according to claim 5, wherein said front face of said board module has an additional longitudinal groove parallel to and along each side of said musical staff.

7. A musical language game according to claim 1, wherein said melody piece has a notch formed therein and contacting said note indiciumm and further comprising a complementary stem piece for inserting into said notch, said note indicium, notch and stem piece cooperating to form a musical note.

8. A musical language game according to claim 1, wherein said board module further has means for horizontally assembling said board module to a second board module for forming a continuous musical staff and means for vertically assembling said board module to a third board module for forming a second musical staff parallel to said first musical staff.

9. A musical language game according to claim 1, wherein said board module has a back face having a plurality of longitudinal grooves defined within said back face.

10. A musical language game according to claim 9, further comprising:
    a plurality of cross-wise pieces each having a pair of longitudinal projections for inserting into two adjacent back face grooves;
    a short longitudinal piece having a longitudinal projection for inserting into on of said back face grooves and for positioning next to one of said cross-wise pieces;
    a cubic piece having a longitudinal projection for inserting one of said back face grooves and for positioning next to one of said cross-wise pieces;
    a first longitudinal connection piece having a pair of notches for inserting one of said cross-wise piece into each notch;
    a second longitudinal connecting piece having three notches for inserting one of said cross-wise piece into each notch; and
    a third longitudinal connecting piece having four notches for inserting one of said cross-wise piece into each notch.

11. A musical language game according to claim 1, further comprising a block presenting on each face thereof a basic rhythmic scheme.

* * * * *